(12) United States Patent
Hatamian et al.

(10) Patent No.: US 7,559,204 B2
(45) Date of Patent: Jul. 14, 2009

(54) PELTIER SYSTEM WITH WATER PURIFICATION MEANS

(76) Inventors: Mehdi Hatamian, 31731 Capuchina Way, Coto De Caza, CA (US) 92679; Mehrtosh A. Ghalebi, 33 Calle Maria, Rancho Santa Margarita, CA (US) 92688

(*) Notice: Subject to any disclaimer, the term of this patent is extended or adjusted under 35 U.S.C. 154(b) by 166 days.

(21) Appl. No.: 11/799,622

(22) Filed: May 2, 2007

(65) Prior Publication Data
US 2007/0261413 A1 Nov. 15, 2007

Related U.S. Application Data

(60) Provisional application No. 60/797,291, filed on May 2, 2006.

(51) Int. Cl.
*F25B 21/02* (2006.01)
(52) U.S. Cl. .......................................... 62/3.4; 62/272
(58) Field of Classification Search .................... 62/3.4, 62/93, 272
See application file for complete search history.

(56) References Cited

U.S. PATENT DOCUMENTS

2005/0269254 A1* 12/2005 Roitman ..................... 210/252

* cited by examiner

*Primary Examiner*—Melvin Jones
(74) *Attorney, Agent, or Firm*—Stetina Brunda Garred & Brucker

(57) ABSTRACT

An improved water generating device is provided for extracting water vapor from ambient air circulated therethrough. The device comprises an air pathway, a fan, a peltier module, a collection reservoir, and a heat sink. The air pathway defines first and second sections. A cold side of the peltier module is disposed in the first section and a hot side of the peltier module, whereto the heat sink is attached, is disposed in the second section of the peltier module. The fan draws the ambient air into the air pathway, and the cold side of the peltier module extracts water vapor out of the ambient air, which collects as water in the collection reservoir. The heat sink is partially disposable in the water and also includes a capillary tube which draws the water thereinto. Additional water vapor is extracted from the air, creating substantially dry air.

19 Claims, 4 Drawing Sheets

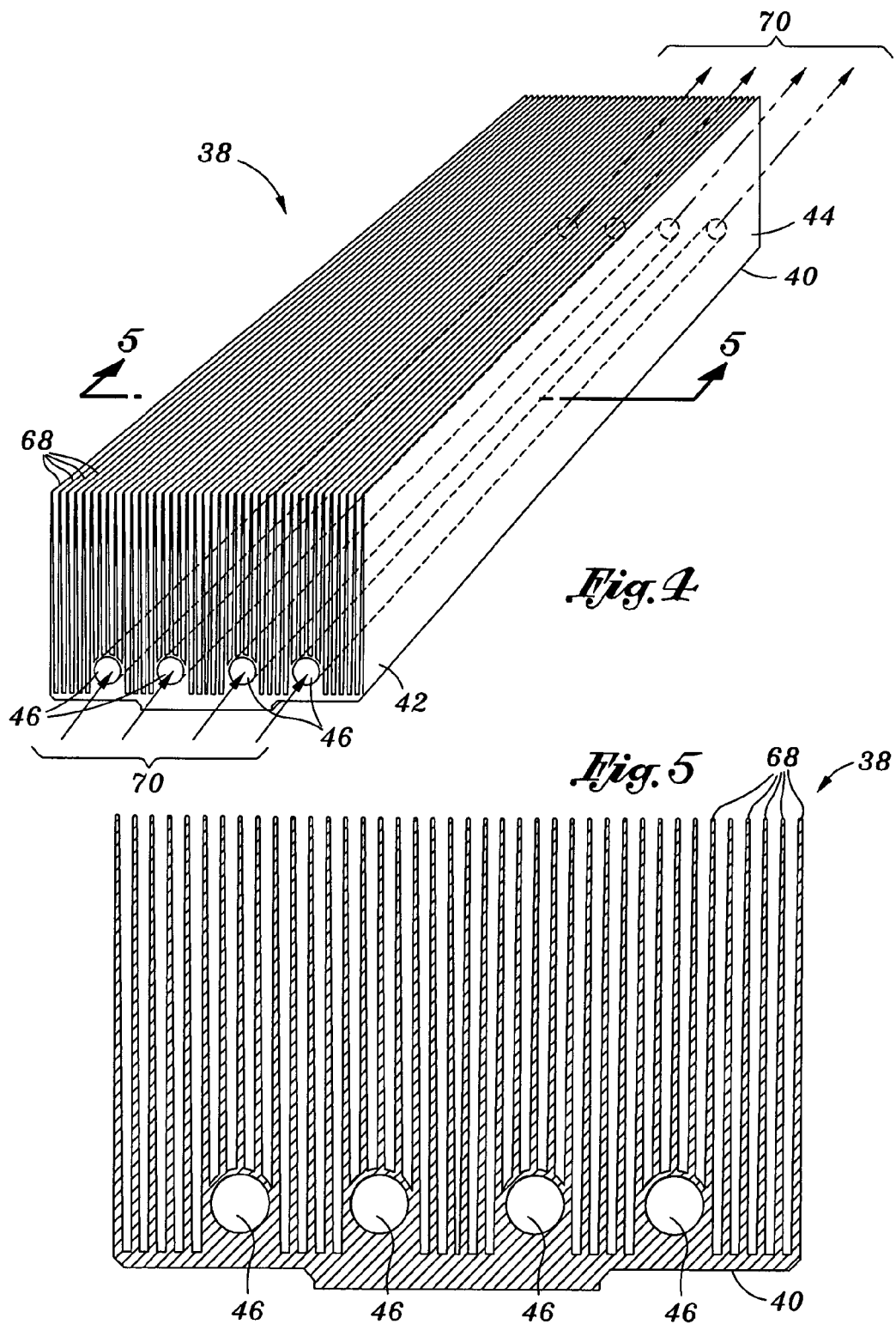

PELTIER SYSTEM WITH WATER PURIFICATION MEANS

CROSS-REFERENCE TO RELATED APPLICATIONS

The present application claims priority to Provisional Patent Application Ser. No. 60/797,291, entitled PELTIER SYSTEM WITH WATER PURIFICATION MEANS, filed May 2, 2006.

STATEMENT RE: FEDERALLY SPONSORED RESEARCH/DEVELOPMENT

Not Applicable

BACKGROUND

The present invention generally relates to water collection devices, and more specifically, to a uniquely configured water generating device that extracts water vapor from ambient air utilizing peltier module and innovative water-cooled heat sink.

Water vapor extraction has been an important technology that has been refined and developed in recent years. In a typical water extraction device, ambient air is past over or by a cold surface to facilitate condensation of water vapor from the ambient air. The device also includes a water collection tank for receiving the condensed water vapor. In addition, in order to enhance the flow of ambient air within the device, a fan or blower may be incorporated into the device.

More recently, improvements to the basic water extraction device described above have included the addition and refinement of water and air purification means. For example, in order to ensure that the air quality is at an acceptable level, air filters have been used to remove any air contaminants prior to condensation of water vapor from the ambient air.

Various water purification methods and apparatuses have also been incorporated into water extraction devices. For example, many such devices now include one or more water filters through which the water passes after being collected in the collection tank. Furthermore, in order to kill microorganisms that may be present in the extracted water, the water may be passed under an ultraviolet light. By implementing the aforementioned filtering devices, one may produce safe, potable and palatable water.

In addition to the improvements mentioned above, water extraction devices have also been modified to include various sensors that are responsive to measurements from the filtering devices. For example, if an air filter becomes clogged, the pressure of the air within the unit may tend to decrease. Thus, by measuring the pressure of the air within the unit, any potential problems with an air filter may be discovered and fixed, thereby optimizing the efficiency and effectiveness of the device.

In addition, timers and other sensors may be used in relation to the above-mentioned water purification filters. For example, the device may include a timer that is operative to alert the user when the service life of a water filter has been reached. Finally, other sensors may be used to measure and detect and impurities in the water, and may alert the user in the event of any problems.

Each of these sensors not only tends to enhance the effectiveness of the water extraction device, but also tends to ensure that the devices may be reliable and operational without significant human interaction and oversight. The various improvements to water extraction devices have made a substantial impact in the viability and utility of such devices. However, there is nevertheless a continuing need to enhance the efficiency of the water vapor extraction process. According to an ideal, the ambient air may be passed through the water vapor extraction device and exit the device as dry air, thus having all of the water vapor removed therefrom. Although such an ideal may not be economically reasonable, improvements in this regard may yet be made to existing water vapor extraction devices.

Therefore, there is a need in the art for an improved water vapor extraction device that has enhanced water vapor extraction efficiency. Furthermore, there is a need in the art for an economic and effective water vapor extraction device that efficiently utilizes both electrical and thermal power. Finally, there is a need in the art for an improved water vapor extraction device that provides for maximum extraction of water vapor from the ambient air and subsequent purification of the extracted water vapor to a form that is suitable for various uses.

BRIEF SUMMARY peltier elements are solid-state devices with no moving parts; they are extremely reliable and do not require any maintenance In order to address and alleviate the above-mentioned deficiencies of the prior art, embodiments of the present invention provide for an improved water generating device that uses the principles of the Peltier Effect and water cooled heat sink technology. As will be appreciated by one of skill in the art, the teachings herein may be utilized to modify the configuration, dimensions, functionality, and capabilities of the water generating device. These and other alternative embodiments, as taught and disclosed herein, are contemplated as being within the scope of the teachings found herein.

According to a first embodiment of the present invention, the water generating device includes an air pathway, a fan, a peltier module, a collection reservoir, and a heat sink. The air pathway includes an air inlet and an air outlet wherethrough the ambient air passes. The air pathway also defines first and second sections. The fan is disposed along the air pathway and is operative to induce flow of the ambient air into the air inlet and out of the air outlet. As the ambient air passes through the first section of the air pathway, it contacts the peltier module, mad condensation of water vapor occurs.

The peltier module, which is disposed along the air pathway, comprises thermally conductive cold and hot sides, a plurality of thermal couples, and first and second electrodes. The cold side of the peltier module is disposed adjacent the first section of the air pathway, and, as mentioned above, may facilitate the condensation or extraction of water vapor from the ambient air. Additionally, the hot side of the peltier module is disposed adjacent the second section of the air pathway. As is commonly known in the art, the peltier module is operative to produce a temperature gradient by passing a voltage through the first and second electrodes and the plurality of thermal couples. The thermal couples are disposed intermediate the cold and hot sides, and are also in thermal communication with the cold and hot sides. When the voltage is passed through one of the first and second electrodes, the voltage continues through the plurality of thermal couples and accordingly, due to the Peltier Effect, there is produced a temperature gradient between the cold and hot sides of the peltier module. In this regard, the cold side reaches a first temperature and the hot side reaches a second temperature, which defines the temperature gradient.

In order to extract water vapor from the ambient air, the first temperature is less than (or equal to) the dew point of the ambient air. As is known in the art, the dew point of the ambient air is generally considered to be the temperature below which water vapor may begin to condense from the ambient air. In other words, as the cold side of the peltier module reaches the first temperature, which is equal to or below the dew point, water vapor will condense onto the cold side of the peltier module. Thus, the water vapor is extracted from the ambient air and there is produced reduced air and water therefrom. The reduced air is defined as having a lower moisture content than the ambient air. Furthermore, the reduced air is produced substantially at a transition point between the first and second sections of the air pathway after the water vapor has condensed from the ambient air.

According to another aspect of the present invention, the collection reservoir is disposed adjacent the peltier module for receiving the water extracted by the cold side of the peltier module. The collection reservoir may be sized and configured according to the dimensions and in relation to the general configuration of the device. Furthermore, the collection reservoir is sized and configured to hold a volume of the water. Furthermore, any water that is collected and removed from the collection reservoir may be filtered utilizing a variety of purification filters. For example, the device may further comprise at least one UV filter that is in optical communication with the water for removing impurities from the water. Additionally, the device may also comprise at least one water filter being in fluid communication with the water for removing impurities from the water.

Accordingly to another aspect of the present invention, the heat sink defines a rear surface and first and second ends. The heat sink is disposed in the second section of the air pathway with the rear surface contacting the hot side of the peltier module. In this regard, the heat sink generally serves to remove heat from the hot side of the peltier module. Subsequently, the heat removed from the hot side of the peltier module may be dissipated from the heat sink due to air flow through the second section of the air pathway. The heat sink includes at least one capillary tube being disposed internally within the heat sink. The capillary tube extends from the first end of the heat sink towards the second end thereof. In addition, the first end of the heat sink extends toward the collection reservoir and is at least partially disposable within the volume of water that is obtainable in the collection reservoir.

In accordance with another aspect of the present invention, the heat sink may be variously configured to effectively dissipate heat from the hot side of the peltier module. In this regard, the heat sink may generally define a second surface area along the second end of the heat sink. Further, the first end of the heat sink may include a diffuse lower section. The diffuse lower section may define a first surface area which is generally greater than the second surface area. As mentioned above, the first end of the heat sink may be at least partially disposable within the volume of water. Thus, the diffuse lower section may be utilized to enhance the heat dissipation from the heat sink to the volume of water. As such, the diffuse lower section may be configured in varying geometries, as may be performed by one of skill in the art, in order to maximize the rate of heat dissipation from the diffuse lower section to the volume of water in the collection reservoir.

Therefore, according to yet another aspect of the present invention, the capillary tube is configured to contact the volume of water and to draw water into the capillary tube via the principle of capillarity. As is known in the art, the principle of capillarity indicates that the water may be drawn upwardly through the capillary tube against the force of gravity because adhesive intermolecular forces between the water and the capillary tube exceed cohesive intermolecular forces within the water itself. Capillarity, also known as capillary motion or capillary action, therefore allows the water to be drawn into the capillary tube up until there is a sufficient weight of the water to enable gravitational forces exerted on the water to be equal to the adhesive intermolecular forces between the water and the capillary tube.

In light of the capillarity and consequent cooling of the heat sink, according to another aspect of the present invention, the heat sink is operative to extract additional water vapor from the reduced air as it passes through the second section of the air pathway. Thus, the reduced air may produce the additional water vapor and become substantially dry air which then exits the air outlet of the device. Any additional water vapor may then percolate into additional water, which is received in the collection reservoir.

According to another embodiment of the present invention, the second end of the heat sink may extend toward the air outlet. In this regard, it is contemplated that the peltier module may be vertically oriented. Thus, the entire rear surface of the heat sink may contact the hot side of the peltier module for facilitating conduction of heat from the hot side of the peltier module to the heat sink. In accordance with a further aspect of the present invention, the device may include a plurality of heat sinks. For example, the device may be configured with the peltier module being vertically mounted within the device and two heat sinks may be mounted to the hot side of the peltier module in vertical parallel relation.

In an implementation of the present invention, the air pathway may be configured with the first section being parallel to the second section. Thus, it is also contemplated that the air inlet may be disposed adjacent the air outlet. In such an embodiment, the device preferably includes a deflector panel that may be disposed intermediate the air inlet and the air outlet for deflecting the substantially dry air exiting the air outlet away from the air inlet. Thus, the ambient air entering the air inlet will not mix with the substantially dry air that is exiting the air outlet. Thus, it is also contemplated that according to another preferred embodiment, the air outlet may be disposed above the air inlet. Such an embodiment takes advantage of the physical principle that hot air rises above cold air and therefore tends to mitigate any mixing of the substantially dry air with moist ambient air.

According to a further embodiment of the present invention, the device may also include a separator panel that is disposed intermediate the first and second sections of the air pathway. The separator panel may extend from adjacent the collection reservoir toward the respective ones of the air inlet and the air outlet. The separator panel is preferably configured as a substantially planar sheet of material, and furthermore, is preferably vertically oriented. In this regard, as mentioned previously, the peltier module which may be oriented vertically, may be mounted to the separator panel.

According to yet another aspect of the present invention, the fan may be mounted adjacent the air outlet for inducing flow of the ambient air into the air inlet and for urging flow of the substantially dry air out of the air outlet. In this regard, the device may further comprise an air filter that is disposed adjacent the air inlet. The air filter may be utilized to remove impurities from the ambient air upon entry into the air pathway.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4 is a perspective view of the heat sink constructed in accordance to a preferred embodiment of the present invention;

FIG. 5 is a cross-sectional view taken along line 2-2 of FIG. 4; and

DETAILED DESCRIPTION

Figure 1:
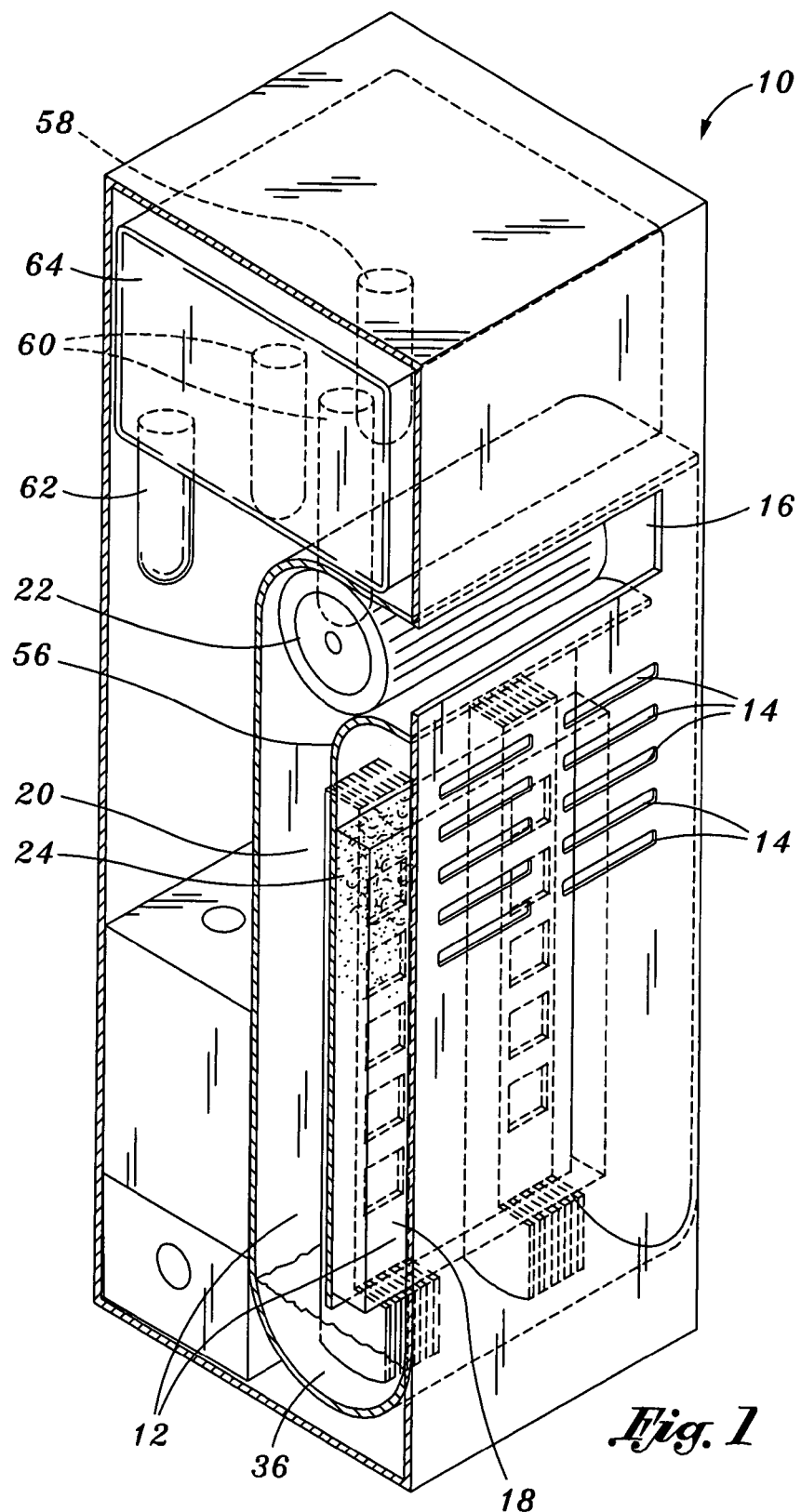
FIG. 1 is a perspective view of an improved water generating device constructed in accordance to a preferred embodiment of the present invention.

Referring now to the drawings wherein the showings are made for purposes of illustrating preferred embodiments of the present invention only, and not for purposes of limiting the same, FIG. 1 is a perspective view of an improved water generating device 10. The device 10 is operative to extract water vapor from ambient air that is circulated through the device 10. Importantly, the device 10 takes advantage of the principals of the Peltier Effect, as well as an innovative water cooled heat sink 38 in order to maximize the amount of water vapor extracted from the air and to minimize any evaporation of extracted water vapor. As will be appreciated by one of skill in the art, the teachings and principals disclosed herein may be applied to modify the configuration of the device 10, including its dimensions, uses, various functionalities and capabilities.

Figure 2:
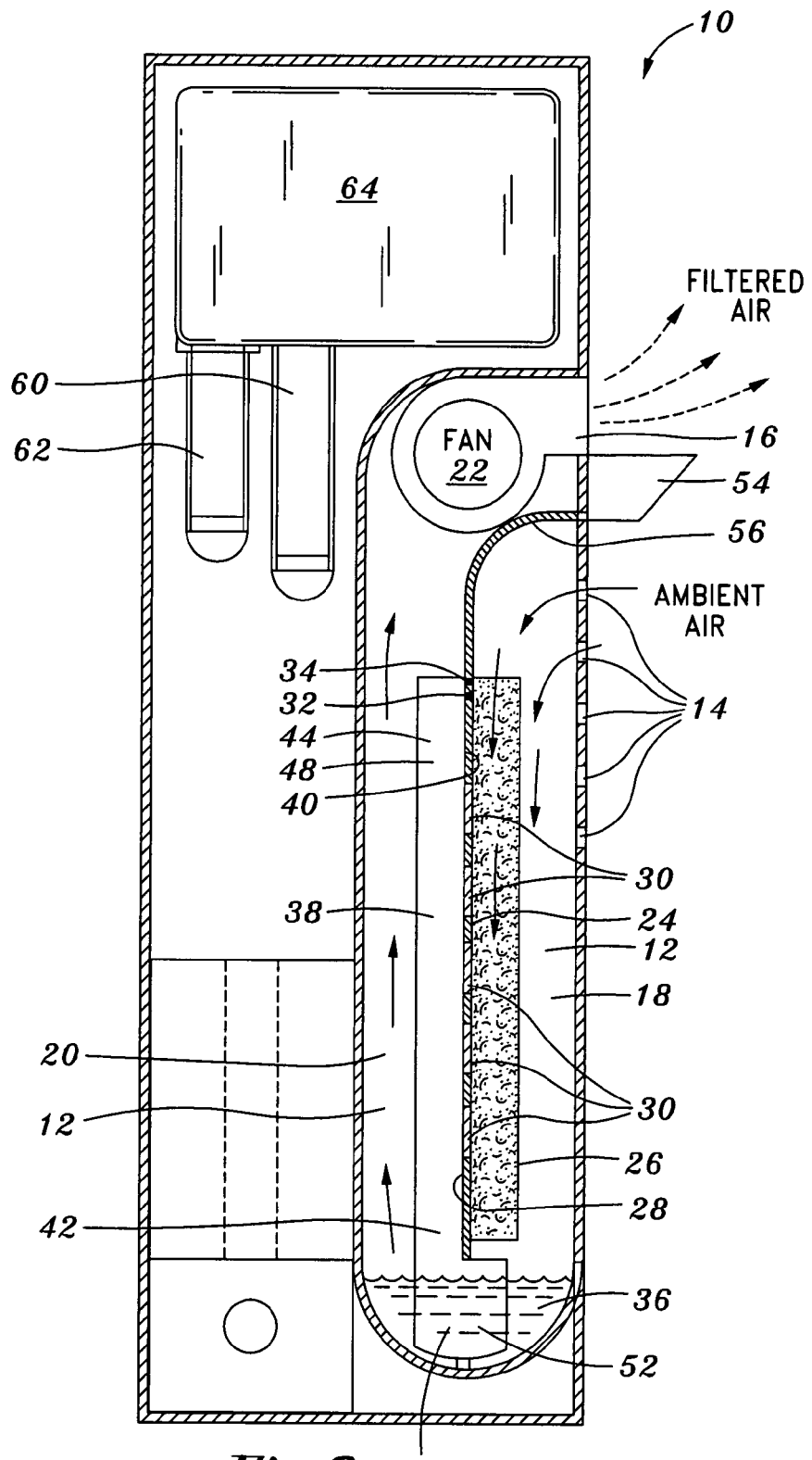
FIG. 2 is a side view taken of the water generating device of FIG. 1 illustrating an exemplary embodiment wherein the device includes an air pathway, a fan, a peltier module, a collection reservoir, and a heat sink.

Referring now to FIG. 1, which illustrates a preferred embodiment of the present invention, the water generating device 10 includes an air pathway 12, a fan 22, a peltier module 24, a collection reservoir 36 and at least one heat sink 38. As shown in FIG. 2, the air pathway 12 includes an air inlet 14 and an air outlet 16 wherethrough the ambient air passes. The air pathway 12 also defines first and second sections 18, 20. Thus, the ambient air may enter the device 10 through the air inlet 14 of the air pathway 12, pass by the peltier module 24 and move toward the air outlet 16. In order to facilitate flow of the ambient air into the air inlet 14, the fan 22 should be placed along the air pathway 12. As illustrated in FIGS. 1 and 2, according to a preferred embodiment, the fan 22 is placed adjacent the air outlet 16. In this regard, the fan 22 may also be placed at the air inlet 14, or at any point along the air pathway 12, which is a design specification that may be modified according to user needs. Further, it is contemplated that the flow of air may be regulated according to a desired flow rate. For example, water extraction may be optimized at certain flow rates of ambient air through the device 10; therefore, this parameter may be modified depending on the properties of the ambient air, such as temperature, humidity, dew point and other such properties. Thus, the conditions associated with the use of the device 10 should be considered in configuring the device 10 and optimizing its use.

Figure 3:
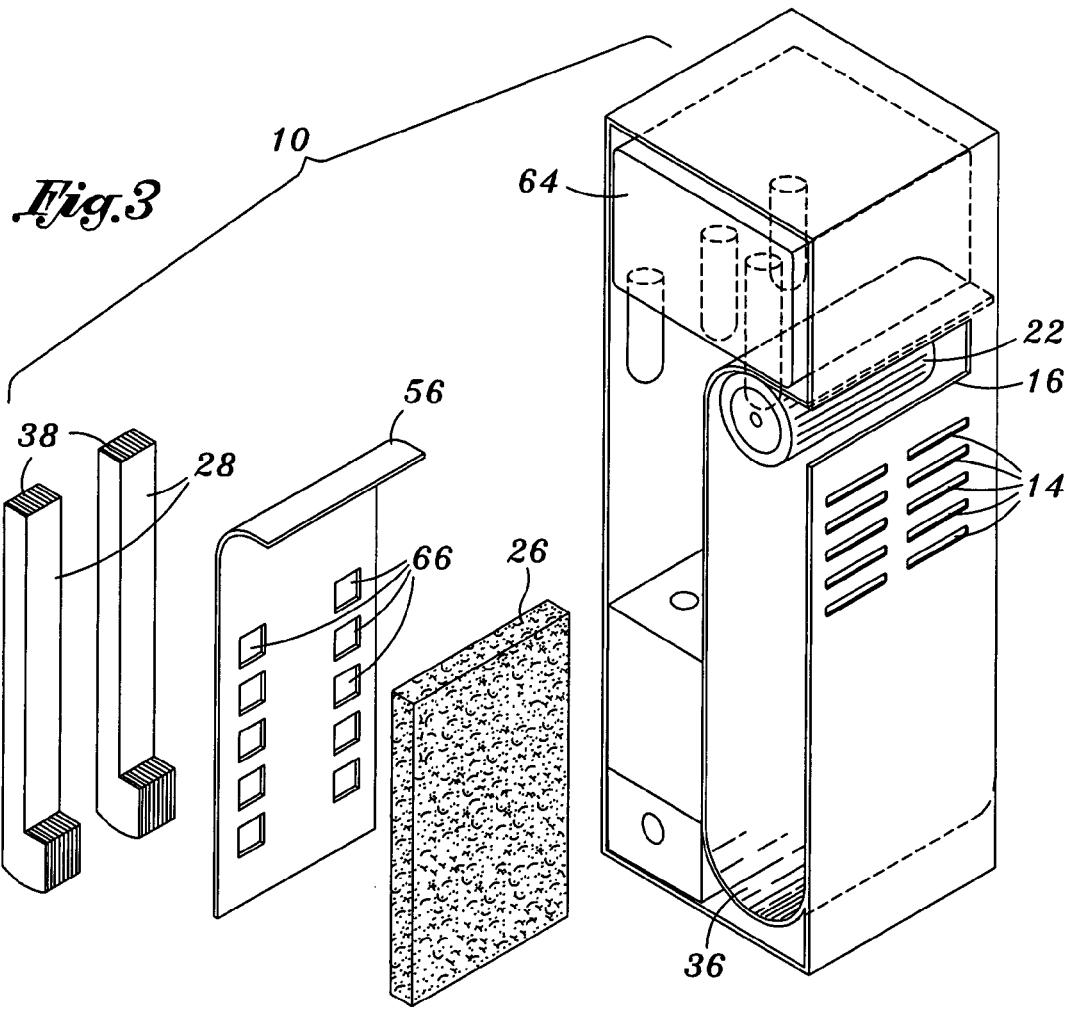
FIG. 3 is an exploded view of the water generating device in accordance to a preferred embodiment of the present invention.

According to one of the innovative aspects of the present invention, the water generating device 10 utilizes at least one peltier module 24 in order to facilitate extraction of the water vapor from the ambient air. As shown in FIGS. 1 and 2, the peltier module 24 is disposed along the air pathway 12. As is known in the art, the peltier module 24 comprises thermally conductive cold and hot sides 26, 28, a plurality of thermocouples 30 and first and second electrodes 32, 34. The peltier module 24 is operative to produce a temperature gradient by passing a voltage through the first and second electrodes 32, 34 and the plurality of thermocouples 30. The thermocouples 30, as illustrated in FIGS. 2 and 3, are disposed intermediate the cold and hot sides 26, 28, and are also in thermal communication with the cold and hot sides 26, 28. Therefore, upon passage of the voltage through the first and second electrodes 32, 34 and the thermocouples 30, as is due to the Peltier Effect, there is produced the temperature gradient between the cold and hot sides 26, 28 of the peltier module 24. The temperature gradient may vary according to the design, the components and configuration of the peltier module 24. In some instances, it may be preferable to have a temperature gradient of 30-45° F. One of the many considerations with regard to the peltier module 24 is the efficiency desired of the peltier module 24 itself. In this regard, the voltage must be input to obtain a given temperature gradient, but in addition, the device 10 must be able to efficiently and effectively dissipate heat produced by the peltier module 24 on the hot side 28 thereof. Thus, as will be discussed below, the desired temperature gradient should be determined in response to overall system efficiencies, including, but not limited to, the required voltage input, the ability of the device 10 to dissipate heat from the hot side 28, and perhaps most importantly, the likelihood of inducing water evaporation in the device 10, which may tend to reduce the amount of water vapor extracted from the ambient air by the device 10.

As illustrated in FIG. 2, and as mentioned above, the ambient air passes by the cold side 26 of the peltier module 24 in the first section 18 of the air pathway 12. During this process, it is contemplated that the cold side 26 of the peltier module 24 should reach a temperature equal to or less than the dew point of the ambient air. As is known in the art, when the cold side 26 of the peltier module 24 is at a temperature equal to or less than the dew point of the ambient air, water vapor will tend to condense from the ambient air. The water vapor may be collected on the cold side 26 of the peltier module 24. For example, various materials may be used to facilitate collection and passage of the water vapor toward the collection reservoir 36 of the device 10. As shown in FIGS. 1 and 2, collection of the water vapor may be aided by gravity according to a preferred embodiment of the present invention. Thus, the water vapor collected on the cold side 26 of the peltier module 24 and in the first section 18 of the air pathway 12 may be gravity-fed toward the collection reservoir 36. In various other configurations of the device 10, which are discussed further below, the air pathway 12 may be configured to be substantially vertical, as shown in FIGS. 1 and 2; however, the air pathway 12 may be oriented horizontally or otherwise. In this regard, the first and second sections 18, 20 of the air pathway 12 may be variously configured to be oriented horizontally, vertically, or otherwise.

As mentioned above, in accordance with another aspect of the present invention, when the water vapor is extracted from the ambient air in the first section 18 of the air pathway 12, there is produced reduced air and water. Thus, as shown clearly in FIG. 2, water is collected in the collection reservoir 36. Further, as the air pathway 12 transitions from the first section 18 to the second section 20, the water vapor is condensed from the ambient air and the ambient air thus becomes reduced air and water. As used herein, the term "reduced air" may be defined as air that has lower moisture content than the ambient air entering the air pathway 12. Thus, it contemplated that the reduced air, which passes through the second section 20 of the air pathway 12, should have a lower moisture content than the ambient air entering into the air inlet 14. One of the important aspects of embodiments of the present invention is that the device 10 preferably outputs substantially dry air. As is known in the art, dry air may be defined as air having little or no water vapor present. Thus, the effectiveness of the device 10, regardless of the climate in which it is located may be determined by how "dry" the reduced air is upon exiting the air outlet 16. As already mentioned, it is contemplated that the reduced air may be substantially dry due to the innovative aspects of the present invention discussed herein.

One such innovative and important aspect of the present invention that tends to improve water extraction is the use of the heat sink 38 in conjunction with the collection reservoir 36. As shown in the exploded view of FIG. 3, as well as the side view of FIG. 2, the collection reservoir 36 is generally disposed at a base of the device 10 and may have a semicircular cross section. According to an aspect of the present invention, the collection reservoir 36 may be disposed adjacent the peltier module 24 for receiving the water extracted by the cold side 26 of the peltier module 24. The collection reservoir 36 is preferably sized and configured according to user requirements, such as the dimensions and general configuration of the device 10. For example, it is contemplated that the device 10 may be utilized in various climates and capacities, and that the configuration of the collection reservoir 36 may be adjusted in response to various design requirements, which may be dictated by the above-mentioned variables. The collection reservoir 36 is sized and configured to hold a volume of the water. Depending on overall device 10 capabilities, such as water removal from the collection reservoir 36, the collection reservoir 36 may be configured to hold a relatively large or small amount of water. For example, the water may be removed immediately from the collection reservoir 36 upon condensation of the water vapor, or the water may be allowed to collect in the collection reservoir 36. In this regard, according to preferred embodiments of the present invention, the volume of water allowed to collect in the collection reservoir 36 should be sufficient to facilitate cooling of the heat sink 38, as will be described below.

In addition, any water that is collected and removed from the collection reservoir 36 may be filtered utilizing a variety of purification filters. As it is known in the art, such filters may include UV filters 58, water filters 60 and the like. For example, the device 10 may utilize one or more UV filters 58 that are placed in optical communication with the water in order to aid in removing impurities such as bacteria from the water. Further, the water may also be filtered via one or more water filters 60, which are also useful to remove other impurities from the water and to tend to ensure that the water is potable and/or suitable for a variety of uses. The water collected by the device 10 may not only be used for human consumption, but may also be used for a variety of other purposes, such as for cooling, manufacturing purposes and a myriad of other purposes.

According to another aspect of the present invention, as illustrated in FIGS. 2 and 3, the heat sink 38 defines a rear surface 40 and first and second ends 42, 44. The heat sink 38 is preferably disposed in the second section 20 of the air pathway 12 with the rear surface 40 contacting the hot side 28 of the peltier module 24. In this regard, it is contemplated that the hot side 28 of the peltier module 24 may be fabricated integrally with the rear surface 40 of the heat sink 38. However, the heat sink 38 may be attached to the hot side 28 of the peltier module 24 utilizing a variety of attachment means, such as mechanical fasteners including nails, screws, hooks and other means such as adhesives and the like, which should preferably allow for thermal conductivity between the hot side 28 of the peltier module 24 and the rear surface 40 of the heat sink 38. Thus, the heat sink 38 is generally configured to remove heat from the hot side 28 of the peltier module 24. Although the heat sink 38 may be configured in a variety of configurations, the heat sink 38 should generally be designed and configured to maximize heat dissipation in response to airflow through the second section 20 of the air pathway 12. Nevertheless, it is also contemplated that the heat sink 38 may include at least one capillary tube 46 that is disposed internally within the heat sink 38. Thus, the capillary tube 46 may be utilized to facilitate water cooling of the heat sink 38. Alternatively, other cooling tubes may be disposed internally within the heat sink 38, and may be of varying geometries and be in fluid communication with a water pump that may circulate water through the heat sink 38 to facilitate water cooling of the heat sink 38.

Referring specifically to FIGS. 4 and 5, a preferred embodiment of the heat sink 38 is shown. As illustrated therein, the heat sink 38 may be configured to include a plurality of fin-like projections 68 that rise generally orthogonally relative to the rear surface 40 of the heat sink 38. Further, there are shown a plurality of capillary tubes 46 that extend from the first end 42 of the heat sink 38 toward the second end 44 thereof. Thus, in a configuration wherein the first end 42 of the heat sink 38 extends toward the collection reservoir 36 and is at least partially disposable within the volume of water that is obtainable in the collection reservoir 36, the capillary tubes 46 may be in fluid communication with the volume of water. Thus, the capillary tubes 46 may therefore be configured to contact the volume of water and to draw water into the capillary tubes 46 via the principle of capillarity 70, illustrated by reference numeral 70 in FIG. 4. As is known in the art, the principle of capillarity 70 indicates that water may be drawn upwardly through the capillary tube 46 against the force of gravity due to intermolecular forces between the water molecules and the capillary tube 46, which exceed the cohesive intermolecular forces within the water itself. Capillarity 70, which is also known as capillary motion or capillary action, may therefore allow the water to rise vertically and be drawn in to the capillary tube 46 until the column of water drawn up into the capillary tube 46 weighs enough to enable gravitational forces to exceed the adhesive intermolecular forces between the water molecules and the capillary tube 46. Thus, according to a preferred embodiment of the present invention, the heat sinks 38 may be configured to utilize the principle of capillarity 70 and produce beneficial effects thereby, including, but not limited to, water vapor extraction from the reduced air, cooling of the heat sink 38 and overall efficiency of the device 10.

As mentioned above, and as illustrated in FIGS. 1-3, the heat sink 38 may be variously configured to effectively dissipate heat from the hot side 28 of the peltier module 24. In this regard, the heat sink 38 may generally define a second surface area 48 along the second end 44 of the heat sink 38. Additionally, the first end 42 of the heat sink 38 may include a diffuse lower section 50. The diffuse lower section 50 may generally define a first surface area 52, which is preferably greater than the second surface area 48. Thus, as shown in the side view of FIG. 2, as well as in the perspective views of FIG. 3, the diffuse lower section 50 may fan out in order to increase the first surface area 52 and thus enhance heat dissipation through the first end 42 of the heat sink 38. As is known in the art, heat transfer through the heat sink 38 may extend generally evenly through the diffuse lower section 50 and result in increased heat removal from the rest of the heat sink 38. In this regard, the diffuse lower section 50 of the heat sink 38 may be in contact with the volume of water disposed in the collection reservoir 36. This interaction may allow heat to be dissipated more readily into the water than may be possible into air. Thus, the heat sink 38 may very efficiently cool the hot side 28 of the peltier module 24 and thereby allow the peltier module 24 to use a higher temperature gradient, which may also result in increased extraction of water vapor in the first section 18 of the air pathway 12. As mentioned previously, these teachings may be utilized to design various configurations and geometries of the components such as the air pathway 12, the peltier module 24, the heat sink 38 as well as the collection reservoir 36.

According to a further innovative aspect of the present invention, the effect and functionality of the heat sink 38 in conjunction with the peltier module 24 and the use of capillary tubes 46 in the heat sink 38 may be operative to extract additional water vapor from the reduced air as it passes through the second section 20 of the air pathway 12. As is known in the art, as the water comes in contact with the heat sink 38, there may be a general tendency of the water to evaporate if the water reaches close to its boiling point. However, as is also known in the art, various other factors may influence the evaporation of the water, such as the dryness of the air, the flow rate of the air and the temperature of the water, just to name a few. In this regard, it is contemplated that the cold side 26 of the peltier module 24 may tend to reduce the temperature in the first section 18 of the air pathway 12, which may tend to reduce the temperature of the ambient air as it passes therethrough. Thus, the ambient air may serve to cool the water that is collected in the collection reservoir 36. Such an effect may therefore tend to reduce the rate of evaporation of the water, as well as to counteract any heating of the water due to the contact of the diffuse lower section 50 of the heat sink 38. Further, according to a preferred embodiment, as shown in FIGS. 1-3, the configuration of the air pathway 12 may also tend to mitigate the effect of air flow over the collection reservoir 36. In this regard, due to the immediate and abrupt change in direction of the air pathway 12, it is contemplated that the evaporation of the water may be consequently reduced. Finally, in light of the unique and innovative configuration of the heat sink 38, including the capillary action of the capillary tubes 46, additional water vapor may be able to be extracted from the reduced air, thus resulting in substantially dry air exiting the air outlet 16 of the air pathway 12.

As mentioned above, the embodiments illustrated in FIGS. 1-3 provide a particularized configuration for the air pathway 12 and the peltier module 24. In such configuration, the second end 44 of the heat sink 38 extends generally toward the air outlet 16. Thus, the heat sink 38 is cooled by the passage of air thereby. Additionally, the peltier module 24 is also illustrated as being generally vertically oriented. Thus, the entire rear surface 40 of the heat sink 38 may be in contact with the hot side 28 of the peltier module 24 in order to facilitate conduction of heat from the hot side 28 of the peltier module 24 to the rear surface 40 of the heat sink 38. Thus, heat may be efficiently transferred from the hot side 28 of the peltier module 24 to the heat sink 38. Additionally, as best illustrated in FIG. 3, the device 10 may be configured to include a plurality of heat sinks 38. For example, as shown in FIG. 3, two heat sinks 38 may be mounted to the hot side 28 of the peltier module 24 in vertical parallel relation. Other heat sinks may also be used, and various other configurations may be implemented in order to enhance or alter the configuration depending on user requirements.

As illustrated in FIG. 2, according to an implementation of the present invention, the air pathway 12 may be configured with the first section 18 being generally parallel to the second section 20. Thus, although in some embodiments, the first section 18 may be oriented at an angle less than 180° with respect to the second section 20 of the air pathway 12, it may be preferred to have the first and second sections 18, 20 in a generally parallel configuration in order to make the device 10 more compact.

As illustrated in FIGS. 1-3, it is also contemplated that the air inlet 14 may be disposed adjacent the air outlet 16. In embodiments where the air outlet 16 is immediately adjacent the air inlet 14, the device 10 should preferably include a deflector panel 54 that may be disposed intermediate the air inlet 14 and the air outlet 16. The deflector panel 54 should be sized and configured to deflect the substantially dry air as it exits from the air outlet 16 so that the substantially dry air does not mix with the ambient air entering the air inlet 14. Thus, the ambient air entering the air inlet 14 should preferably have a maximum moisture content relative to the air in the general climate whereat the device 10 is located.

Furthermore, it is also contemplated that the air inlet 14 should be disposed below the air outlet 16. As is known in the art, the principle of hot air rising may be effectively used to enhance the efficiency of water vapor extraction of the device 10 by allowing the substantially dry air to exit above the air inlet 14 of the air pathway 12 because it is contemplated that the substantially dry air will not only have a much lower moisture content than the ambient air, but that after passing through the second section 20 of the air pathway 12, whereat the hot side 28 of the peltier module 24 is dissipating heat through the heat sinks 38, the substantially dry air may be much hotter than the ambient air. Thus, the substantially dry air exiting the air outlet 16 may tend to rise relative to the ambient air that enters through the air inlet 14. According to yet another unique aspect of the present invention, the device 10 may also include a separator panel 56, as shown in FIG. 3. The separator panel 56 is preferably disposed intermediate the first and second sections 18, 20 of the air pathway 12. The separator panel 56 may not only serve to delimit the boundaries of the first and second sections 18, 20 of the air pathway 12, but may also be configured to include particular structure so that the peltier module 24 may be mounted thereon. Thus, according to this innovative and unique aspect of the present invention, the configuration of the device 10 may therefore be more compact and space efficient. As illustrated in FIG. 3, the separator panel 56 may include a plurality of apertures 66 wherethrough the thermocouples 30 and any necessary circuitry may be disposed in order to facilitate electrical communication between the cold and hot sides 26, 28 of the peltier module 24. Furthermore, as illustrated in FIG. 2, the separator panel 56 may extend generally vertically from adjacent the collection reservoir 36 toward the respective ones of the air inlet 14 and the air outlet 16. As illustrated in FIGS. 2 and 3, the separator panel 56 may preferably be configured as a substantially planar sheet of metal. Nevertheless, as discussed above, when the air outlet 16 and the air inlet 14 are necessarily separated, the separator panel 56 may likewise be configured to facilitate such a separation. Thus, as discussed herein, the separator panel 56 may be utilized to direct airflow through the air pathway 12, as well as to determine the mounting and orientation of various components of the device 10, including the peltier module 24, the heat sinks 38 and others, such as the fan 22. Utilizing these teachings, it is contemplated that one of skill in the art may devise alternative configurations in order to effectuate many of the important goals and aspects of the present invention.

According to yet another aspect of the present invention, the fan 22 is preferably mounted adjacent the air outlet 16 of the air pathway 12. The fan 22 is therefore operative to urge flow of the substantially dry air out of the air outlet 16 in such a configuration. However, it is also contemplated that the fan 22 may be disposed along the air pathway 12 at various points in the air pathway 12 in order to induce flow of the ambient air into the air inlet 14 and to ensure that the flow of air is steady and constant. Furthermore, it is also contemplated that a plurality of fans 22 may be used as required by user requirements.

In addition, the ambient air may also be filtered in order to remove impurities as it enters the air inlet 14. Therefore, the device 10 may be configured to include an air filter 62 which may thus remove dust, pollution and/or other particulate matter from the ambient air. Such an implementation may therefore enhance not only the purity of the water, but also tend to ensure the maximum life of the various components of the device 10, including the water tubing, collection reservoir 36, pumps, the heat sink 38, peltier module 24 and the fan 22, just to name a few. Indeed, purity of air and water may tend to ensure that the device 10 is able to have a much longer service life than would be possible if the air and water had particulate and other impurities therein.

Figure 6:
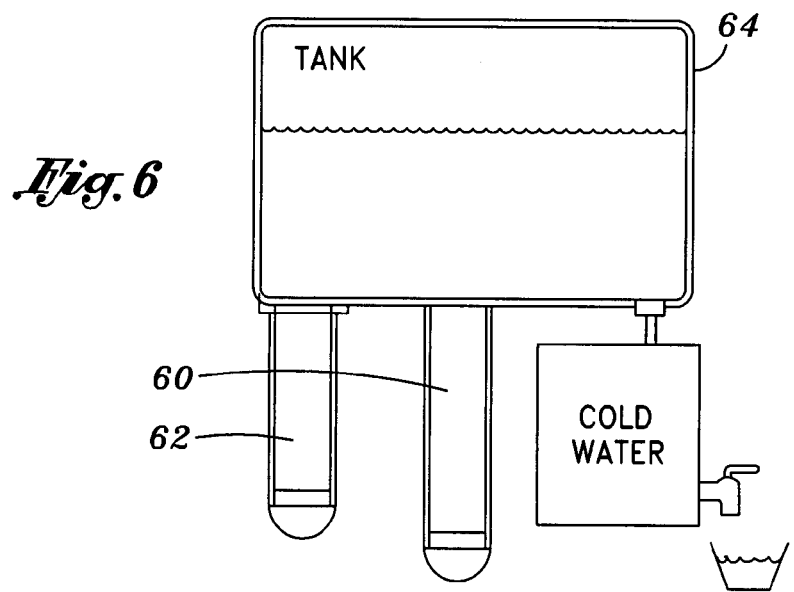
FIG. 6 is a side view of a storage tank of the water generating device for storing water produced thereby in accordance with an embodiment of the present invention.

Finally, after the water is collected in the collection reservoir 36, it may pumped to a variety of stations in order to facilitate its use. For example, as shown in FIGS. 2 and 6, the water may be subsequently pumped to a storage tank 64 where it may be then used for consumption and/or other purposes. In this regard, the various hoses, valves, pumps and other componentry necessary to move the water from one location to another may be modified and implemented according to skill of one of the art.

The above description is given by way of example, and not limitation. Given the above disclosure, one of skill in the art could devise variations that are within the scope of the invention disclosed herein, including various ways of configuring the air pathway 12, manipulating the temperature gradient of the peltier module 24, manipulating the configuration of peltier module 24, altering the configuration of the heat sinks 38 and the like. Further, the various features and embodiments disclosed herein can be used alone, or in varying combinations with each other and are not intended to be limited to the specific combinations described herein. Thus, the scope of the claims is not to be limited by the illustrated embodiments.

What is claimed is:

1. An improved water generating device for extracting water vapor from ambient air circulated therethrough, the device comprising:

an air pathway including an air inlet and an air outlet wherethrough the ambient air passes, the air pathway defining first and second sections;

a fan being disposed along the air pathway and being operative to induce flow of the ambient air into the air inlet and out of the air outlet;

a peltier module being disposed along the air pathway and comprising:

thermally conductive cold and hot sides, the cold side being disposed adjacent the first section of the air pathway, the hot side being disposed adjacent the second section of the air pathway;

a plurality of thermocouples being disposed intermediate the cold and hot sides, the thermocouples being in thermal communication with the cold and hot sides; and first and second electrodes being in electrical communication with the plurality of thermocouples for producing a temperature gradient, the temperature gradient being defined by the cold side reaching a first temperature and the hot side reaching a second temperature upon passage of a voltage through the first and second electrodes and the thermocouples, the first temperature being less than the dew point of the ambient air for facilitating extraction of the water vapor from the ambient air to thereby produce reduced air and water, the reduced air having a lower moisture content than the ambient air;

a collection reservoir being disposed adjacent the peltier module for receiving the water extracted by the cold side, the collection reservoir being sized and configured to hold a volume of the water; and a heat sink defining a rear surface and first and second ends, the heat sink being disposed in the second section of the air pathway with the rear surface contacting the hot side of the peltier module for removing heat from the hot side, the heat sink including at least one capillary tube being disposed internally within the heat sink, the capillary tube extending from the first end toward the second end, the first end extending toward the collection reservoir and being at least partially disposable within the volume of water obtainable in the collection reservoir, the capillary tube being configured to contact the volume of water and to draw water thereinto via capillarity, the heat sink being operative to extract additional water vapor from the reduced air to produce substantially dry air and additional water, the additional water being receivable by the collection reservoir.

2. The device of claim 1 wherein the second end of the heat sink extends toward the air outlet.

3. The device of claim 1 wherein the second end of the heat sink defines a second surface area and the first end of the heat sink includes a diffuse lower section, the diffuse lower section defining a first surface area being generally greater than the second surface area for dissipating heat through the volume of water obtainable in the collection reservoir.

4. The device of claim 1 wherein the entire rear surface of the heat sink contacts the hot side of the peltier module for facilitating conduction of heat from the hot side of the peltier module to the heat sink.

5. The device of claim 1 including a plurality of heat sinks for removing heat from the hot side of peltier module.

6. The device of claim 5 wherein the peltier module is vertically mounted within the device and two heat sinks are mounted to the hot side of the peltier module in vertical parallel relation.

7. The device of claim 1 wherein the air pathway is configured with the first section being parallel to the second section.

8. The device of claim 7 wherein the air inlet is disposed adjacent the air outlet.

9. The device of claim 8 wherein a deflector panel is disposed intermediate the air inlet and the air outlet for deflecting the substantially dry air exiting the air outlet away from the air inlet.

10. The device of claim 9 wherein the air outlet is disposed above the air inlet.

11. The device of claim 1 further including a separator panel being disposed intermediate the first and second sections of the air pathway, the separator panel extending from adjacent the collection reservoir toward the respective ones of the air inlet and the air outlet.

12. The device of claim 11 wherein the separator panel is configured as a substantially planar sheet of material.

13. The device of claim 12 wherein the separator panel is vertically oriented.

14. The device of claim 13 wherein the peltier module is mounted to the separator panel.

15. The device of claim 1 wherein the peltier module is vertically oriented.

16. The device of claim 1 wherein the fan is mounted adjacent the air outlet for inducing flow of the ambient air into the air inlet and out of the air outlet.

17. The device of claim 1 further comprising at least one UV filter being in optical communication with the water for removing impurities from the water.

18. The device of claim 1 further comprising at least one water filter being in fluid communication with the water for removing impurities from the water.

19. The device of claim 1 further comprising an air filter being disposed adjacent the air inlet for removing impurities from the ambient air upon entry into the air pathway.

* * * * *